United States Patent [19]

DiGiacomo

[11] 4,287,071

[45] Sep. 1, 1981

[54] SIMULTANEOUS EXTRACTION OF MORE THAN ONE ION BY LIQUID MEMBRANE PROCESS

[75] Inventor: Peter M. DiGiacomo, Mission Viejo, Calif.

[73] Assignee: Occidental Research Corporation, Irvine, Calif.

[21] Appl. No.: 83,500

[22] Filed: Oct. 10, 1979

[51] Int. Cl.$^3$ .............................................. B01D 11/04
[52] U.S. Cl. .................................. 210/643; 423/112; 423/139; 423/157; 423/321 S; 423/8
[58] Field of Search ..................... 210/21, 22 R, 23 R, 210/642, 643; 423/321 R, 321 S, 112, 139, 157

[56] References Cited

U.S. PATENT DOCUMENTS

| | | | |
|---|---|---|---|
| Re. 30,125 | 10/1979 | Li et al. | 210/22 R |
| 3,637,488 | 1/1972 | Li et al. | 210/22 R |
| 3,821,351 | 6/1974 | Lucid | 423/321 S |
| 4,081,369 | 3/1978 | Li et al. | 210/22 R |
| 4,082,836 | 4/1978 | Ore | 423/321 S |
| 4,086,163 | 4/1978 | Cahn et al. | 210/21 X |

*Primary Examiner*—Thomas G. Wyse
*Attorney, Agent, or Firm*—Christie, Parker & Hale

[57] ABSTRACT

A liquid membrane process for removing ions from solution which comprises contacting a solution containing a first ion and a second ion with an emulsion, said emulsion comprising an external phase which is immiscible with said solution and contains a first complexing agent, and a second complexing agent, said first complexing agent being capable of forming a first complex with said first ion, and said second complexing agent being capable of forming a second complex with said second ion, both of said complexes being soluble in said external phase, and an internal phase, which comprises a (1) decomplexing agent, said decomplexing agent being capable of converting said first complex into said first complexing agent and said first ion and (2) an inhibiting agent which is capable of inhibiting the formation of said first complex, whereby the first ion diffuses from said solution into said internal phase, and said second ion diffuses from said solution into said external phase.

11 Claims, No Drawings

SIMULTANEOUS EXTRACTION OF MORE THAN ONE ION BY LIQUID MEMBRANE PROCESS

BACKGROUND OF THE INVENTION

1. Field of the Invention

A liquid membrane process for removing ions from solution which comprises contacting a solution containing a first ion and a second ion with an emulsion, said emulsion comprising an external phase which is immiscible with said solution and contains a first complexing agent, and a second complexing agent, said first complexing agent being capable of forming a first complex with said first ion, and said second complexing agent being capable of forming a second complex with said second ion, both of said complexes being soluble in said external phase, and an internal phase, which comprises a (1) decomplexing agent, said decomplexing agent being capable of converting said first conplex into said first complexing agent and said first ion and (2) an inhibiting agent which is capable of inhibiting the formation of said first complex, whereby the first ion diffuses from said solution into said internal phase, and said second ion diffuses from said solution into said external phase.

Preferably, the ions are metal ions - for example, the first ion may be selected from the group consisting of magnesium, calcium, iron, aluminum or any mixture thereof, and said second ion may be uranium. The metal ion may be in either a cationic or anionic form. The complexing agents are generally oil-soluble ion-exchange compounds such as, for example, pyrophosphates, carboxylates, amines, oximes, etc., which are insoluble in the aqueous solution.

2. Description of the Prior Art

The removal of specific ions or compounds from dilute solutions and concentrating them in another solution is desirable in many metallurgical and waste water treating processes. Generally the dilute solution is aqueous in nature. Processes for such removal, which have been used, include the following:

1. Extraction of the ions or compounds into water immiscible phase which may contain a complexing or ion exchange agent followed by reextraction into another aqueous phase.

2. Liquid membrane permeation with a membrane which allows permeation of the specific ions or compounds in one form, followed by reaction with a dissolved chemical encapsulated as an aqueous phase inside the membrane so as to convert the permeating ions or compounds into a nonpermeating species, i.e. by neutralization or precipitation. See, for example, U.S. Pat. Nos. 3,617,546, and 3,779,907.

SUMMARY OF THE INSTANT INVENTION

The instant invention relates to a liquid membrane process for removing ions from solution which comprises contacting a solution containing a first ion and a second ion with an emulsion, said emulsion comprising an external phase which is immiscible with said solution and contains a first complexing agent, and a second complexing agent, said first complexing agent being capable of forming a first complex with said first ion, and said second complexing agent being capable of forming a second complex with said second ion, both of said complexes being soluble in said external phase, and an internal phase, which comprises a (1) decomplexing agent, said decomplexing agent being capable of converting said first complex into said first complexing agent and said first ion and (2) an inhibiting agent which is capable of inhibiting the formation of said first complex, whereby the first ion diffuses from said solution into said internal phase, and said second ion diffuses from said solution into said external phase. More particularly the instant invention comprises the similtaneous extraction of at least two ions from a solution by a liquid membrane process wherein at least one ion is isolated in the external phase of the liquid membrane emulsion and at least one ion is isolated in the internal phase of the emulsion. This invention is especially suitable for removing ions from aqueous solutions therefore the liquid membrane emulsion is of the water-in-oil type. One feature of the instant invention is that it enables the similtaneous separation of two interfering ions. For example in the most preferred separation process described hereinbelow, uranium and magnesium ions are separated from phosphoric acid by use of an emulsion wherein complexing agents for uranium and magnesium, (di-n-octyl pyro phosphoric acid (DOPA) and dinonylnaphthalene sulfonic acid (DNSA), respectively) are included in the external phase of the emulsion and a strong acid which decomplexes the complex of magnesium and DNSA is included in the internal phase. It is known that the above complexing agents like many others mutually interfere and therefore can not be used efficiently in the similtaneous liquid-liquid extraction processes of the art.

More specifically the distribution coefficient of the magnesium in the DNSA containing external phase is dependent on the concentration of DNSA. However, high concentrations of DNSA unduly thicken the external phase of the emulsion. In the instant process the capacity of the emulsion is determined by the internal phase therefore it is not necessary to have a high distribution coefficient for both ions.

The instant process is generally useful where complexing agents interfere with each other in multi ion separations and is not limited to the above interference mode.

The ions are preferably metal ions in either a cationic or anionic form—for example, magnesium ion or a complex ion, such as $HgCl_4^=$, comprising a metal component. Ions may be removed from aqueous solutions and accumulated within water-in-oil emulsions by means of this process. To remove metal ions, complexing agents—for example, a oil-soluble ion-exchange compounds, are provided in the external, i.e. membrane, phase of the water-in-oil emulsion. The ion-exchange compounds will be selected to be able to combine selectively with the metal ions to form a complex which is soluble in the external phase. At least one complex must be decomplexed by a decomplexing agent present in the internal phase. In the case of a uranium ion, the ion-exchange compound may be selected from the group consisting of phosphates, pyrophosphates, etc., such as for example di-2-ethylhexyl phosphoric acid, trioctyl phosphine oxide, octyl phenylphosphate, di-n-octylpyrophosphoric acid. In the case of magnesium, calcium, aluminum, and iron ions, the ion exchange compound may be selected from the group consisting of sulfonates, such as di-nonyl naphthalene sulfonic acid, di-dodecyl naphthalene sulfuric acid, etc. In the case of other ions, those skilled in the art will be able to select the ion-exchange compound in accordance with the chemical identity of the ion which is to be removed and the principles of the invention disclosed herein.

The external phase of the emulsion will also contain a solvent for said ion-exchange compounds, although ion-exchange compounds which are liquids at the temperature at which the process is carried out may be used neat, and desirably a surface active agent to promote stability of the emulsion. Solvents which are useful in the process of the instant invention must be immiscible with the aqueous solution and capable of dissolving the desired ion-exchange compounds. Furthermore, the solvent must be such that a stable emulsion may be prepared since the stability of the emulsion is critical to the success of the process of the instant invention. Solvents which are suitable in general for preparing the emulsions used in the instant process include hydrocarbon liquids, chlorinated hydrocarbons, etc. The ion exchanger compounds, while having a certain amount of surface activity, are generally combined with a surfactant in such emulsion. This surfactant may be selected from those known in the art provided it is stable under the conditions of operation of the instant process. For example, in one of the most preferred embodiments of the instant invention, as further explained herein, the complex of the second ion and the second complexing agent is decomplexed in the internal phase of the emulsion by a strong acid. In this preferred embodiment, the surfactant must be capable of providing stable emulsions and also be stable to highly acidic environments.

In general, the various surface-active agents and solvents which are useful in the process of the instant invention as well as many of the ion-exchange compounds useful as complexing agents are disclosed in U.S. Pat. No. 3,779,907 herein incorporated by reference. This patent also describes suitable conditions including temperature, pressure, etc. at which the instant process can be carried out.

In the internal phase of the emulsion, a decomplexing agent is maintained at a level which promotes decomplexing of the second ion with the second complexing agent. For example, in the case of magnesium ion and DNSA the stability of the complex is dependent on the aqueous acid concentration in contact with it. The higher the acid concentration, the more magnesium ion is stripped to the aqueous phase, i.e. the internal phase. Therefore the acidity of the internal phase of the emulsion is maintained with strong sulfuric acid preferably at acid concentrations of 50-200 g/l $H_2SO_4$, whereby at the interface of the internal phase and the external phase of the emulsion, the complex is destroyed leaving the magnesium ion in the internal phase of the emulsion. In order to keep the second complex (i.e. of the second ion and the second complexing agent) from reforming when the level of the second ion reaches high concentrations in the internal phase, an inhibiting agent is also provided in the internal phase. It will be appreciated that if the second complex reforms it can permeate back through the external phase into the solution. The inhibiting agent can be an agent which converts the second ion into a form which will not complex with the second complexing agent, e.g. a precipitant for the second ion, an oxidizing or reducing agent which changes the second ion into a noncomplexing valence state, a third complexing agent which complexes more strongly with the second ion than the second complexing agent, etc., or the inhibiting agent may preferentailly complex with the second complexing agent itself. In the above example, the strong acid provides sufficient hydrogen ions to preferentially complex with the DNSA and therefore the magnesium ions are trapped in the internal phase due to the low solubioity of noncomplexed magnesium in the external phase. In this example the strong sulfuric acid acts both as a decomplexing agent and an inhibiting agent. Other inhibiting agents are described in the above U.S. Patent hereby incorporated by reference in its entirety.

In the process of the instant invention an emulsion is formed having all of the necessary characteristics described above, i.e. since in general the emulsions are used to treat aqueous solutions, a water-in-oil (that is, an emulsion wherein the internal phase is aqueous and the external phase is oil) is prepared. This emulsion may be prepared by means known in the art - for example, the aqueous phase which may be a sulfuric acid solution having an acid concentration above 100 g/l is added over a period of time to an agitating solution comprising a mixture of complexing agents such as DNSA and DOPA dissolved in a hydrocarbon liquid such as kerosene in which a hydrophobic silica dispersing aid is suspended. After the sulfuric acid solution is added, in an amount sufficient to provide an emulsion, wherein the sulfuric acid solution makes up approximately 50 weight percent of the total emulsion, agitation is discontinued. This stable emulsion may be contacted with an aqueous solution containing dissolved uranium and magnesium—for example, from ~10 to ~150 milligrams uranium per liter and from ~1 to ~10 grams of magnesium per liter. This solution may include phosphoric acid. The aqueuos solution and the emulsion may be contacted by means known in the art—for example, contacting in one or more extraction mixers or in static mixers followed by settlers may be used. For the purposes of example, however, aqueous solutions and the emulsion are contacted in a batch operation. The emulsion, being a water-in-oil emulsion, is not miscible with the aqueous solution and thus, depending on the respective specific gravity will either float on the aqueous solution or will be dispersed by said agitation in said aqueous solution. The volume ratio of the aqueous solution to the emulsion may vary from about 100 to 1: preferably from about 4 to 1. The individual droplets of the emulsion provide what has been termed a "liquid membrane"—that is, the external phase of the emulsion, i.e. the oil interfaces with the aqueous solution. At this interface, uranium ion is complexed with the DOPA dissolved in the external phase to form a complex which is soluble in the external phase of the emulsion. Also the magnesium ion complexes with the DNSA to form a complex which is soluble in the external phase of the emulsion. These soluble complexes permeate through the external phase to the interface of the internal phase and the external phase of the emulsion. At this interface, because of the low pH of the internal phase, the magnesium-DNSA complex is not stable and decomposes yielding the complexing agent and magnesium ion. The magnesium ion being soluble in the aqueous internal phase but not in the external phase of the emulsion will be dissolved therein. The magnesium ion is thus trapped in the internal phase of the emulsion. At the interface of the internal phase and the external phase of the emulsion, the complexing agent will combine with a hydrogen ion, since this form is favored in the presence of a high hydrogen ion concentration. The hydrogen ion containing species will then permeate back to the interface of the external phase of the emulsion and the aqueous solution where it is available for further complexing with magnesium ion present in the aqueous solution. It may be thus seen from this description that the external phase of the emulsion, i.e. the liquid membrane, acts as a one-way transfer means for the magnesium ion and a countercurrent one-way transfer means for hydrogen ion. The uranium-DOPA complex, on the other hand, is stable in the presence of the strong acid of the internal phase of the emulsion. Therefore this complex remains in the external phase wherein it is soluble.

The complexes transfer through the external phase of the emulsion, i.e. the liquid membrane, due to the concentration difference in the external phase itself. At the interface of the external phase of the emulsion and the aqueous solution there exists a high concentration of the complex of DNSA and the ion—for example, magnesium ion, while at the interface of the external phase of the emulsion and the internal phase due to high acidity, the complex is destroyed. Therefore there exists a low concentration of the magnesium ion-DNSA complex. At this interface, of course, the concentration of the hydrogen ion-DNSA complex will be higher than at the interface of the aqueous solution and the external phase of the emulsion. Due to this concentration difference, what occurs is a permeation of the magnesium ion combined with DNSA from the aqueous solution to the internal phase of the emulsion while the complex of the hydrogen ion and the DNSA permeates from the internal phase of the emulsion to the aqueous solution. It can thus be seen that the pH of the aqueous sulfuric acid solution that comprises the internal phase will continue to decrease, due to an efflux of hydrogen ions carried across the membrane from within the emulsion countercurrent to the magnesium ions being carried in, while the concentration of magnesium ion in the aqueous phosphoric acid solution decreases. The uranium ion-DOPA complex remains in the external phase of the emulsion. The transfer of uranium ion into this external phase is limited only by the concentration of DOPA in the external phase. The transfer or magnesium of course is limited only by the capacity of the internal phase of the emulsion. The acidity of the internal phase of the emulsion must be maintained at a level wherein decomplexing occurs. This can be done merely by providing sufficient acid concentration in the initial emulsion to provide a sufficient acid over the course of removing the magnesium ion from the aqueous solution, so that the acid concentration never goes below 50–100 g/l $H_2SO_4$.

The process of the instant invention is specifically applicable to removal of the metal ions from aqueous waste streams as well as aqueous solutions, such as result from hydrometallurgical operations. The process of the instant invention is especially applicable to the removal of uranium and other undesirable metal ions, such as magnesium, calcium, aluminum, and iron from phosphoric acid solutions which are obtained by the wet process for phosphoric acid manufacture.

The resultant solution will contain uranium ion in concentrations which may range from 10 mg/liter up to 150 or higher. This same solution will, of course, also contain other dissolved ions such as iron, aluminum, magnesium, and calcium as well as hydrogen ions. It is necessary to separate and concentrate the uranium and transfer the other undesirable ions from the phosphoric acid solution to purify such phosphoric acid and recover valuable uranium.

In the conventional solvent extraction process, the phosphoric acid solution is contacted with a solution containing DOPA to extract the uranium ions and then such extracted solution is treated to remove the other undesirable ions. The extraction may be carried out in several countercurrent mixer-settler stages. The uranium ion is thus extracted selectively down to the desired low level by means of the DOPA, from which it can be stripped in a subsequent operation.

However, one of the disadvantages of the conventional process is that, two stages are required for purifying the phosphoric acid. Even if the debit of the similtaneous extraction of uranium and the other undesirable ions described above (i.e. the low distribution coefficient of magnesium in the presence of DOPA) is acceptable, the valuable uranium must be separated from the other undesirable ions in a subsequent step. In the instant process, even though the capacity of the external phase for magnesium is relatively low the very large quantities of solution that must be circulated, mixed, settled and stripped, with the resultant high inventory cost in the prior art process, are avoided because of the transfer of the magnesium into the internal phase of the emulsion rather than only into the external phase. The prior art process is also inefficient in that the driving force for magnesium transfer is rather small between the two phases at any given stage, resulting in high contacting requirements (i.e. strong agitation and long mixing time).

In the process of the instant invention, the stripping solution for magnesium and the other undesirable metal ions disclosed above (strong sulfuric acid) is incorporated into the extracting emulsion as the internal aqueous droplet phase. It may have an acid concentration between 30 and 200 g/l, preferably between 100 and 175 g $H_2SO_4$/l. The external emulsion phase is a mixture of DNSA and DOPA in a hydrocarbon oil. Preferably the external emulsion is about 50%, by weight, complexing agents with a ratio of 2 parts DNSA to 1 part DOPA, by weight, so as to accomplish the desired transfer of uranium ions into said external emulsion phase and the magnesium ions and other undesirable ion into the internal phase of the emulsion droplets.

The emulsion formulation may range from 0.3/1 to 3.0/1 wt./wt. oil/aqueous (i.e. external/internal) with a range of 0.5/1–2/1 being preferred.

The emulsion is contacted with the phosphoric acid solution in a single mixer-settler stage where the uranium, magnesium and other undesirable ions are extracted out of the aqueous feed by means of the liquid membrane emulsion. Since the "stripping solution" is incorporated in the emulsion, the driving force for removal of magnesium and other undesirable ions from the phosphoric acid is always present the process may not necessarily require countercurrent contacting of the emulsion and the phosphoric acid for example, a single settling stage, may be used.

However, in order to maximize the rate of extraction of the ions, it is preferable to subdivide the mixing reactor into several counter-current stages. This results in a decreasing ion concentration in the aqueous present in the various stages, leading to improved extraction rates compared to a single contacting stage.

In the instant invention, the first complexing agent is only used to transfer ions from the solution to the internal phase of the emulsion, thus much less amounts are necessary than in the prior art solvent extraction processes wherein the complexing agent remains chemically tied (reacted) to the ion.

Thus, since the magnesium concentration (or other undesirable ions) in the internal phase of the emulsion can increase by up to 20 grams/liter between "fresh"

and "spent" emulsion, and the internal to external ratio in the emulsion may be 1/1 to 2/1, the capacity of the emulsion will be up to 10 grams/liter of emulsion or up to 3 fold of the capacity of DNSA dissolved in kerosene.

The spent emulsion and treated phosphoric acid are separated in a settler and the phosphoric acid, depleted in the above ions, is recovered. The spent emulsion is now processed to recover the uranium values concentrated therein and the complexing agents. If it is desired, the other undesirable metal ions may be recovered also.

This recovery can be achieved in a number of ways, some of which are described below.

1. Demulsification by treatment with emulsion-breaking solvents, i.e. a mixture of an oil-soluble and water-soluble solvent such as cyclohexane and isopropanol. (See, for example U.S. Pat. No. 4,001,109 issued Jan. 4, 1977, in the names of Li, Hucal and Cahn.)

2. Demulsification by physical means including centrifugation and vigorous agitation with an aqueous solution. The external phase of the emulsion is treated to recover the uranium contained therein. This recovery can be obtained with the prior art process for recovering uranium from liquid-liquid extraction processes. That is, the external phase may be agitated with an aqueous strong acid, such as HF, to re-extract the uranium into said aqueous acid. The mixture of complexing agents remaining after such re-extraction can be recycled for reuse.

The internal phase of the emulsion will contain a mixture of magnesium, calcium, iron and aluminum in aqueous sulfuric acid. The value of this mixture is very low and therefore may be discarded if environmentally expedient. It is well known, that solutions of this kind may be treated to recover the individual components if such recovery is desirable.

The sulfuric acid remaining after the removal of the above ions may be recycled to make fresh emulsion.

Other techniques for breaking the liquid membrane emulsion include heat, passing the emulsion through a high shear zone in the presence of finely divided coalescing material which wets the internal phase preferentially, as well as the above-mentioned alternates.

The instant process may be used in waste treatment processes, such as the removal of trace quantities of metallic contaminants. By the use of at least two complexing agents dissolved in the external phase, and by the inclusion of a decomplexing agent for one of the complexes formed by said complexing agents, and an inhibiting agent, such as a strong acid ($H^+$, $OH^-$, $Cl^-$, etc.) internal aqueous droplet phase, emulsions can very effectively clean up even small amounts of metallic impurities from dilute solutions and concentrate these metallic impurities selectively in the internal phase and the external phase of the emulsion. Concentration differences of many thousandfold between the solution and internal aqueous phases can be maintained so that very low levels (parts per billion) of metallic contaminants can be reached in the waste water being treated while the emulsion is being loaded to a considerable degree (several percent) with the contaminant. The above discussed interference between complexing agents may be amended therefore the external phase can effectively "collect" a metal ion impurity. Since the quantity of emulsion used up often is very small, the emulsion can be burned or otherwise disposed of at less expense than by going through one of the previously described recovery techniques.

Typical waste water contaminants which can be removed by the instant process include those ions disclosed in U.S. Pat. No. 3,779,907.

EXAMPLE

The external phase of the emulsion was formulated with DNSA (dinonylnaphthalene sulfonic acid) as the magnesium carrier and di-n-octylpyrophosphoric acid (DOPA) as the uranium complexer. DOPA has a very strong interaction with $U^{IV}$ and will extract it from phosphoric acid with a high distribution coefficient. The internal phase of the emulsion (stripping solution) was 200 g/l $H_2SO_4$/. This emulsion was stabilized with Silanox 101—a hydrophobic silica available from Cabot. The emulsion formulation is given below.

External Phase: 19 g of 50% by weight DNSA in mineral oil 4.5 g DOPA
Internal Phase: 20 ml of 200 g/l $H_2SO_4$
Solid Stabilizer: 0.4 g Silanox 101

This emulsion is very viscous and does not disperse very well. It was quite stable to the experimental conditions of this run.

To 100 ml of 28% phosphoric acid as $P_2O_5$ (which additionally contained 5.08 gm/liter MgO, 1.19 gm/liter CaO, 53 mg/liter U, 10.7 gm/liter $Al_2O_3$, 12.2 gm/liter and $Fe_2O_3$, as well as 381 gm/liter $P_2O_5$) in a 250 ml separatory funnel was charged 42 g of emulsion. The mixture was agitated by hand for 5 minutes. A sample (10 ml) of the bulk aqueous was withdrawn. Shaking was continued for another 5 minutes and a second sample was taken (10 ml). The extraction was stopped and the emulsion allowed to coalesce. The emulsion coalesced slowly (10 min.) due to its high viscosity. The remaining bulk solution was removed. (There was some entrained bulk solution in the emulsion). Essentially all of the emulsion was recovered and broken by dilution with 80 ml of hexane. The aqueous phase i.e. the internal phase of the emulsion, contained a significant amount of solid ($CaSO_4$ and Silanox). After filtration 17 ml of internal aqueous was recovered—this is essentially all that is expected from 42 g of emulsion. The hexane phase was analyzed for uranium and the aqueous phase was analyzed for the other ions.

The following table presents the results of this experiment.

Table 1 indicates that extraction of magnesium and uranium take place simultaneously with transport of magnesium, calcium, iron and aluminum to the internal phase and complexing of the uranium in the organic phase.

TABLE 1

| Extraction of Uranium & Other Ions from Phosphoric Acid | | | | | | |
|---|---|---|---|---|---|---|
| | | % Extracted | | | | |
| Sample | Time(min.) | MgO | CaO | U | $P_2O_5$ | $Fe_2O_3$ | $Al_2O_3$ |
| 1 | 5 | 13.8 | 21.0 | 49 | 3.7 | 13.1 | 7.5 |
| 2 | 10 | 17.7 | 29.4 | 64 | 5.0 | 16.4 | 12.2 |

Note that 74% of the extracted MgO had been stripped into the internal phase at the time the emulsion was broken. The remainder was still in the external phase.

What is claimed is:

1. A liquid membrane process for removing ions from solution which comprises:
   (a) contacting a solution comprising a first ion and a second ion with an emulsion, said emulsion comprising an external phase which is immiscible with said solution and comprises a first complexing agent and a second complexing agent, said first complexing agent being capable of forming a first complex with said first ion and said second complexing agent being capable of forming a second complex with said second ion, both of said complexes being soluble in said external phase, and an internal phase, which comprises (1) decomplexing agent, said decomplexing agent being capable of converting said first complex into said first complexing agent and said first ion, and (2) an inhibiting agent which is capable of inhibiting the formation of said first complex;

(b) forming in said external phase a first complex of said first ion and said first complexing agent and a second complex of said second ion and said second complexing agent; and (c) decomplexing the first complex in said internal phase whereby the first ion remains in said internal phase, and said second ion remains in said external phase in said second complex.

2. The process of claim 1 wherein said second ion is uranium.

3. The process of claim 2 wherein said first ion is selected from the group consisting of magnesium, calcium, aluminum, iron and mixtures thereof.

4. The process of claim 3 wherein said solution is a phosphoric acid solution.

5. The process of claim 4 wherein second complexing agent is selected from the group consisting of phosphates and pyrophosphates.

6. The process of claim 4 wherein said second complexing agent is selected from the group consisting of diethylhexyl phosphoric acid, trioctyl phosphine oxide, octylphenyl phosphate, and di-n-octyl pyrophosphoric acid.

7. The process of claim 4 wherein said first complexing agent is a sulfonate.

8. The process of claim 4 wherein said first complexing agent is selected from the group consisting of di-nonylnaphthalene sulfonic acid and di-dodecyl naphthalene sulfonic acid.

9. The process of claim 4 wherein said decomplexing agent and said inhibiting agent is a strong acid.

10. The process of claim 9 wherein said strong acid is sulfuric acid.

11. A liquid membrane process for removing metallic ionic impurities contained in a phosphoric acid solution, and separating such ionic impurities, which comprises:

(a) contacting the phosphoric acid solution containing a first ionic impurity selected from the group consisting of magnesium, calcium, aluminum, iron and mixtures thereof, and as a second ionic impurity uranium ion with an emulsion comprising an external phase which is immiscible with said phosphoric acid and comprising a first complexing agent which is a sulfonate capable of forming a first complex with said first ionic impurity and a second complexing agent selected from the group consisting of phosphonates and pyrophosphates capable of forming a second complex with uranium ion, said first complexing agent, said second complexing agent, said first complex, and second complex being soluble in said external phase and an internal phase comprising a strong acid;

(b) forming in said external phase a first complex of said first ionic impurity of said first complexing agent and a second complex of uranium with said second complexing agent; and (c) decomplexing said first complex by action of said strong acid on said first complex in said internal phase whereby said first ionic impurity remains in said internal phase and the uranium remains in said external phase in said second complex.

* * * * *

UNITED STATES PATENT AND TRADEMARK OFFICE
CERTIFICATE OF CORRECTION

PATENT NO. : 4,287,071
DATED : September 1, 1981
INVENTOR(S) : Peter M. DiGiacomo It is certified that error appears in the above-identified patent and that said Letters Patent are hereby corrected as shown below:

Column 3, line 16, "exchanger" should be --exchange--.

Column 4, line 1, "solubioity" should be --solubility--.

Column 6, line 57, after "aqueous" and before "present" insert --phase--.

Column 10, line 31, "of" should be --and--.

Signed and Sealed this

First Day of December 1981

[SEAL]

Attest:

Attesting Officer

GERALD J. MOSSINGHOFF

Commissioner of Patents and Trademarks